(12) United States Patent
Gribetz

(10) Patent No.: US 10,698,496 B2
(45) Date of Patent: *Jun. 30, 2020

(54) SYSTEM AND METHOD FOR TRACKING A HUMAN HAND IN AN AUGMENTED REALITY ENVIRONMENT

(71) Applicant: Meta View, Inc., San Mateo, CA (US)

(72) Inventor: Yishai Gribetz, Belmont, CA (US)

(73) Assignee: Meta View, Inc., San Mateo, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/962,852

(22) Filed: Apr. 25, 2018

(65) Prior Publication Data

US 2018/0239439 A1    Aug. 23, 2018

Related U.S. Application Data

(63) Continuation of application No. 15/263,318, filed on Sep. 12, 2016, now Pat. No. 9,958,951.

(51) Int. Cl.

| *G06F 3/01* | (2006.01) |
|---|---|
| *G06F 3/03* | (2006.01) |
| *G06T 19/00* | (2011.01) |
| *G06T 7/246* | (2017.01) |
| *G06K 9/00* | (2006.01) |
| *G06K 9/46* | (2006.01) |

(Continued)

(52) U.S. Cl.
CPC ............. *G06F 3/017* (2013.01); *G06F 3/011* (2013.01); *G06F 3/0304* (2013.01); *G06K 9/00355* (2013.01); *G06K 9/00671* (2013.01); *G06K 9/46* (2013.01); *G06T 7/246* (2017.01); *G06T 7/251* (2017.01); *G06T 19/006* (2013.01); *G06K 9/6215* (2013.01); *G06K 2009/3291* (2013.01); *G06T 2207/10016* (2013.01); *G06T 2207/30196* (2013.01)

(58) Field of Classification Search
CPC ........ G06F 3/011; G06F 3/0304; G06F 3/017; G06F 3/04815; G06K 9/00355; G06K 9/00375; G06K 9/4652; G06K 9/4609; G06K 9/6272; G06K 9/4671; G06K 9/00087; G06K 9/6215; G06K 9/46; G06K 2009/3225; G06T 7/73; G06T 7/13; G06T 7/174; G06T 7/246; G06T 19/006; G06T 2207/30241; G06T 2207/30196; G06T 13/40; G06T 7/251; G06T 17/00

See application file for complete search history.

(56) References Cited

U.S. PATENT DOCUMENTS 8,274,535 B2    9/2012  Hildreth
8,351,651 B2    1/2013  Lee
(Continued)

*Primary Examiner* — Dismery Mercedes

(57) ABSTRACT

A system configured for tracking a human hand in an augmented reality environment may comprise a distancing device, one or more physical processors, and/or other components. The distancing device may be configured to generate output signals conveying position information. The position information may include positions of surfaces of real-world objects, including surfaces of a human hand. Feature positions of one or more hand features of the hand may be determined through iterative operations of determining estimated feature positions of individual hand features from estimated feature position of other ones of the hand features.

20 Claims, 6 Drawing Sheets

(51) Int. Cl.
*G06K 9/62* (2006.01)
*G06K 9/32* (2006.01)

(56) References Cited

U.S. PATENT DOCUMENTS

| | | | | |
|---|---|---|---|---|
| 8,648,808 B2* | 2/2014 | Cheng | ................... | G06F 3/0304 |
| | | | | 345/166 |
| 9,304,594 B2 | 4/2016 | Finocchio | | |
| 9,469,558 B2 | 10/2016 | Regmi | | |
| 9,665,767 B2 | 5/2017 | Guan | | |
| 9,772,679 B1 | 9/2017 | Schiewe | | |
| 9,958,951 B1* | 5/2018 | Gribetz | ................... | G06F 3/017 |
| 10,044,711 B2* | 8/2018 | Yoon | ................. | G06K 9/00382 |
| 10,229,313 B1* | 3/2019 | Gribetz | ..................... | G06T 7/50 |
| 2008/0273755 A1* | 11/2008 | Hildreth | ............... | G06F 1/1626 |
| | | | | 382/103 |
| 2011/0080490 A1 | 4/2011 | Clarkson | | |
| 2011/0142353 A1* | 6/2011 | Hoshino | ............ | G06K 9/00375 |
| | | | | 382/203 |
| 2012/0319945 A1* | 12/2012 | McCarthy | ............... | G06F 3/017 |
| | | | | 345/156 |
| 2013/0158946 A1* | 6/2013 | Scherberger | ............ | G06F 3/014 |
| | | | | 702/151 |
| 2013/0278501 A1 | 10/2013 | Bulzacki | | |
| 2015/0035961 A1* | 2/2015 | Chen | .................. | G06K 9/00067 |
| | | | | 348/77 |
| 2015/0177842 A1* | 6/2015 | Rudenko | ................. | G06F 3/017 |
| | | | | 345/156 |
| 2015/0253863 A1 | 9/2015 | Babin | | |
| 2015/0253864 A1 | 9/2015 | Parkhomenko | | |
| 2016/0078289 A1* | 3/2016 | Michel | ..................... | G06T 7/73 |
| | | | | 345/156 |
| 2016/0124513 A1* | 5/2016 | Dal Zot | ................. | G06F 3/011 |
| | | | | 715/863 |
| 2016/0162673 A1* | 6/2016 | Kutliroff | ................. | G06F 21/32 |
| | | | | 382/115 |
| 2017/0147075 A1* | 5/2017 | Lerner | .................... | G06F 3/017 |
| 2017/0154214 A1 | 6/2017 | Freeman | | |
| 2017/0235143 A1 | 8/2017 | Chi | | |

\* cited by examiner

SYSTEM AND METHOD FOR TRACKING A HUMAN HAND IN AN AUGMENTED REALITY ENVIRONMENT

FIELD OF THE INVENTION

The system and methods described herein relate to tracking a human hand in an augmented reality environment.

BACKGROUND OF THE INVENTION

There are many types of vision systems that provide virtual or augmented reality displays. In particular, wearable technology such as head mounted displays (HMD) are becoming more popular. Features of the human body may be tracked to facilitate gesture-based input into the augmented reality environment.

SUMMARY

The systems and methods described herein facilitate tracking a human hand in an augmented reality environment. In some implementations, a hand may be tracked by determining feature positions one or more hand features of the hand. A distancing device may be configured to generate output signals conveying position information. The position information may include positions of surfaces of a hand. Feature positions of one or more hand features of the hand may be determined through one or more iterations including operations of determining estimated feature positions of individual hand features from estimated feature positions of other ones of the hand features. Such an iterative procedure may be performed as position information may be obtained. The position information may be obtained based on a sampling rate of the distancing device.

In some implementations, an estimated feature position of a first hand feature may be determined from position information. In an iteration, an estimated feature position of a second hand feature of the hand may be determined from the estimated feature position of the first hand feature. An estimated feature position of set of hand features may be determined from the estimated feature position of the second hand feature. An estimated feature position of the first hand feature may be determined from the estimated feature position of the set of hand features. An estimated feature position of the set of hand features may include a set of feature positions wherein individual feature positions in the set of feature positions correspond to individual hand features in the set of hand features. The estimated feature positions of the first hand feature may be compared to determine a difference between those positions.

Based on the difference being equal to or below a threshold distance, the feature positions of one or more of the first hand feature, second hand feature, set of hand features, and/or other hand features may be specified by the corresponding estimated featured positions used in the current iteration.

Based on the difference being equal to or above a threshold distance, one or more further iterations may be performed. At an iteration where a difference in estimated feature positions of the first hand feature may be below a threshold distance, the feature positions or one or more hand features may be specified by the estimated feature positions of the one or more hand features used in that iteration.

It is noted that while one or more features and/or functions of the system and method presented here may be directed to augmented reality environments, this is for illustrative purposes only and is not to be considered limiting. For example, in some implementations, one or more features and/or functions of the system and method presented may be similarly applied to virtual environments.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
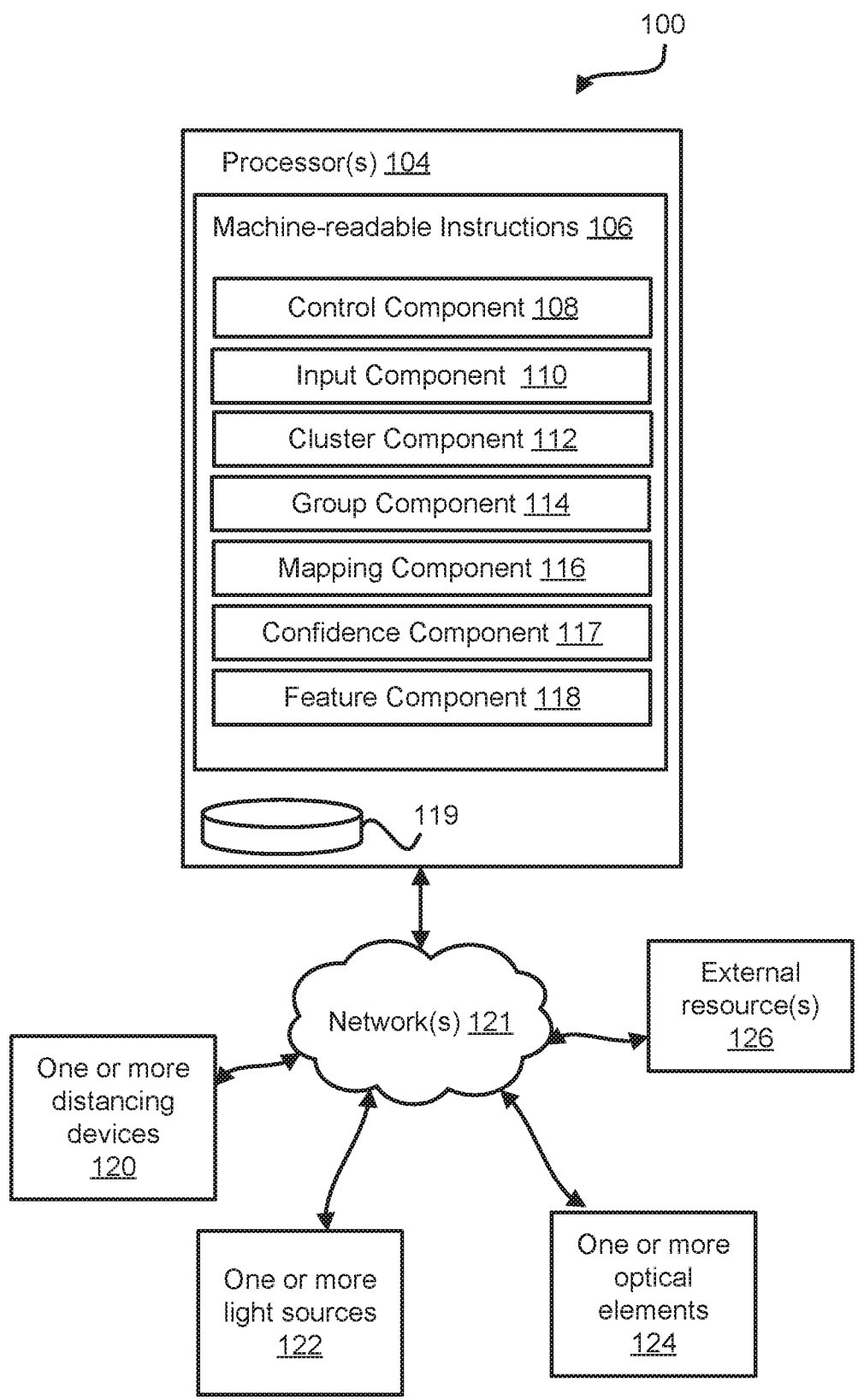
FIG. 1 illustrates a system configured for tracking a human hand in an augmented reality environment, in accordance with one or more implementations.

FIG. 1 shows a system 100 configured for tracking a human hand in an augmented reality environment. The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems employing hardware and/or software architectures to form virtual content (e.g., digital images) that may be located and/or perceived to be located in real-world space by virtue of the principles of the depth sensitive modules of the human brain. The views of virtual content, in addition to the views of the real-world within a user's field-of-view, may define the augmented reality environment.

In some implementations, simulated manipulation of virtual content in an augmented reality environment may be based on user input and/or other input. In some implementations, user input may comprise gesture-based input and/or other input. In some implementations, gesture-based input may be based on tracking of one or more human features of a user. By way of non-limiting illustration, gesture-based input may be based on tracking one or more of a hand, an arm, a torso, and/or other features of a user. By tracking a user's hands, gestures including one or more of reaching, grabbing, releasing, touching, swiping, pointing and/or other gestures may be identified. The identified gestures may be provided as input for simulating manipulation of virtual content within a user's field-of-view. For example, an identified gesture may be correlated to a perceived position of a virtual object within a user's field-of-view. The virtual object may be configured to react to the gesture in an interactive manner.

The system 100 may include one or more of one or more physical processors 104, one or more distancing devices 120, one or more light sources 122, one or more optical elements 124, and/or other components. In some implementations, one or more components of system 100 may be incorporated in a head-mounted display (HMD), and/or other devices. By way of non-limiting illustration, one or more optical elements 124 may comprise at least part of a visor of an HMD. An optical element may comprise one or more reflective, or partially reflective surfaces on a visor. An optical element may be formed from a reflective or partially reflective material. A reflective and/or partially reflective material may comprise one or more of ZEONEX, polycarbonate, PMMA, and/or other materials.

In some implementations, individual light sources of one or more light sources 122 may comprise one or more of a liquid crystal display (LCD), a light emitting diode (LED) display, surface-conduction electron-emitter display (SED), a plasma display, a transparent organic light emitting diode (OLED) display, a MEMS mirror based display, liquid crystal on silicon (LCoS) display, digital light projector (DLP), a laser, an RGB laser, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be reflected by one or more optical elements 124 to one or more eyes of the user. The user may perceive the reflected light as virtual content in a perceived three-dimensional light field within their field-of-view. In some implementations, control of position and/or light generation of individual light sources 122 may impact one or more aspects of a perceived three-dimensional light field and/or virtual content within the perceived the three-dimensional light field. One or more aspects of a perceived three-dimensional light field may include one or more of a perceived distance of the three-dimensional light field from the user, a depth of the perceived three-dimensional light field, and/or other aspects of the three-dimensional light field. One or more aspects of virtual content within a three-dimensional light field may include one or more of a perceived distance of the virtual content from a user, a depth of the virtual content, a size of the virtual content, and/or other aspects of the virtual content. For example, in some implementations, moving a position of an individual light source closer to an optical element may cause virtual content to be perceived closer to the user; while moving the position of the individual light source farther from the optical element may cause the virtual content to be perceived farther from the user.

Figure 7:
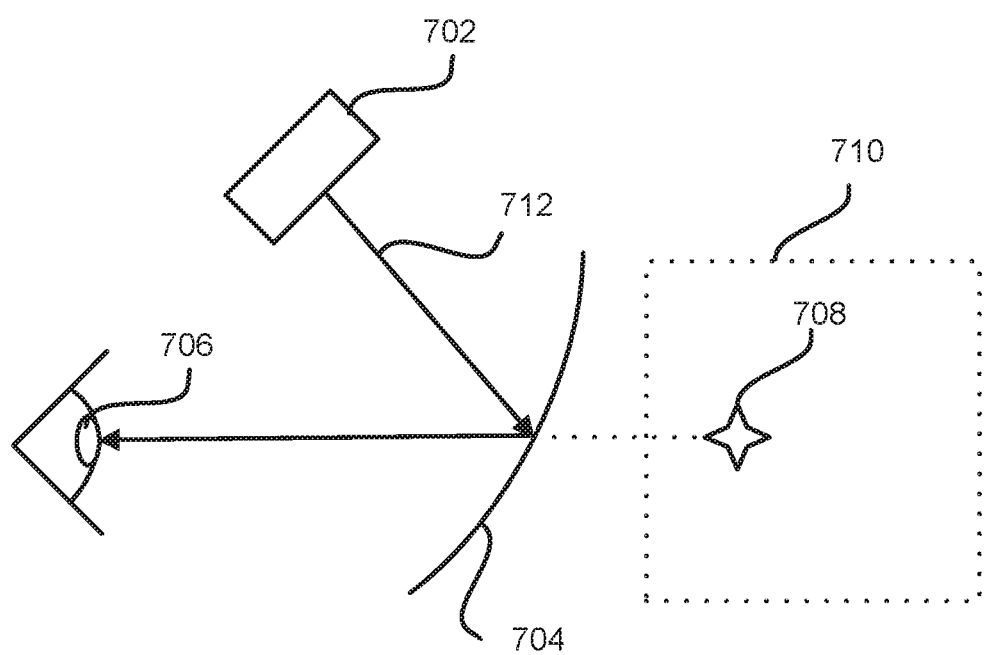
FIG. 7 illustrates an exemplary configuration of a light source and an optical element configured to generate virtual content to be perceived within a field-of-view of a user.

By way of non-limiting illustration, FIG. 7 shows an exemplary configuration of a light source 702 and an optical element 704 for generating virtual content 708 to be perceived within a three-dimensional light field 710. In some implementations, one or more of light source 702, optical element 704, and/or other components may be incorporated into a head-mounted display, and/or other devices. FIG. 7 shows a light beam 712 emitted from light source 702. The light beam 712 may reflect off optical element 704 into a user's eye 706. The light beam 712 may be part of light generated by light source 702 to depict a digital image. The digital image may correspond to virtual content 708. In some implementations, position of light source 702 may be incrementally adjusted to obtain incremental adjustments to a perceived range of virtual content 708 within three-dimensional light field 710. In some implementations, the depth and/or bounds of three-dimensional light field 710 may be limited by an adjustable range of light source 702 being closer to and/or farther from optical element 704.

Returning to FIG. 1, individual distancing devices of one or more distancing devices 120 may be configured to generate output signals conveying position information and/or other information. Position information may include positions of one or more surfaces of one or more real-world objects within a real-world environment. The one or more distancing devices 120 may include one or more of a camera, a three-dimensional scanner, a depth sensor, a rangefinder, a laser gauge, a time-of-flight sensor, a volumetric imaging sensor, an IR camera/emitter pair, a passive, structured, or unstructured light stereo pair, and/or other devices.

In some implementations, a position of a surface may be expressed as one or more of distance from an individual distancing device, an angle from reference line (e.g., a horizontal line), a three-dimensional spatial coordinate in a coordinate system, and/or other information. For example, in a three-dimensional Cartesian coordinate system, a spatial coordinates may expressed as individual values of one or more of an x-component, y-component, z-component, and/or other components.

In some implementations, position information may comprise point could information. Point cloud information may include positions of points in individual sets of points, referred to as "point clouds." In some implementations, individual points in a point cloud may have real-world spatial coordinates corresponding to individual positions of individual surfaces in the real-world. A set of points may correspond to positions of a set of surfaces within a range of vision of a distancing device. Individual points may be associated with individual time stamps. An individual time stamp may correspond to an individual point in time when an individual a position of an individual surface may have been measured (e.g., based on a sampling rate of the distancing device). It is noted that one or more references to "a surface" or "surfaces" may refer to "a point" or "points," respectively, within a point cloud that lie on the surfaces and convey position of the surfaces in the real-world. In some implementations, a set of surfaces and/or a set of points may form a contiguous surface. In some implementations, a set of surfaces and/or a set of points may make up a contiguous object.

The one or more physical processors 104 may be configured by machine-readable instructions 106. Executing machine-readable instructions 106 may cause one or more physical processors 104 to facilitate tracking a human hand in an augmented reality environment. The machine-readable instructions 106 may include one or more of a control component 108, an input component 110, a cluster component 112, a group component 114, a mapping component 116, a confidence component 117, a feature component 118, and/or other components.

In some implementations, control component 108 may be configured to control one or more components of system 100. In some implementations, control component 108 may be configured to control individual distancing devices of one or more distancing devices 120, and/or other components. In some implementations, control of individual distancing devices of one or more distancing devices 120 may include control of one or more of a sampling rate at which individual distancing devices of one or more distancing devices 120 generate output signals, at sampling period in which individual distancing devices of one or more distancing devices 120 generate output signals, and/or other control of individual distancing devices of one or more distancing devices 120.

In some implementations, control component 108 may be configured to control individual light sources of one or more light sources 122, and/or other components. In some implementations, control of individual light sources of one or more light sources 122 may include one or more of control of light emission in accordance with one or more instances of virtual content to be generated and/or presented in an augmented reality environment, and/or other types of control. By way of non-limiting illustration, control component 108 may be configured to control a first light source to generate a view of an instance of a first virtual object.

The input component 110 may be configured to obtain position information and/or other information. Position information may be derived from output signal of individual distancing devices of one or more distancing devices 120 and/or from other sources. In some implementations, position information may be obtained at a sampling rate of individual distancing devices of one or more distancing devices 120.

The cluster component 112 may be configured to determine, from obtained position information, individual clusters of surfaces. In some implementations, a set of surfaces may be determined as a cluster based on one or more of proximity of individual surfaces in the set of surfaces, a density of the set of surfaces (e.g., a quantity of surfaces within a given spatial volume), and/or other factors. Determining a cluster of a set of surfaces based proximity may comprise determining, in a pairwise manner, that pairs of surfaces in the set of surfaces may be within a threshold distance from one another. For example, a first set of surfaces may comprise a first surface, a second surface, a third surface, and/or other surfaces. The first surface may be determined to be within a threshold distance of the second surface. The second surface may be determined to be within a threshold distance of the third surface. In some implementations, independent of a distance of the first surface from the third surface, the first set of surface may be determined to be a cluster of surfaces.

It is noted that the above description of determining clusters of surfaces is provided for illustrative purposes only and is not to be considered limiting. For example, in some implementations, clusters may be determined by other techniques.

The group component 114 may be configured to determine cluster groups. Individual cluster groups may include one or more clusters of surfaces that may make up individual contiguous objects. In some implementations, one or more clusters of surfaces may be determined to make up an individual contiguous object based on one or more of proximity of individual clusters, a density of clusters (e.g., a quantity of clusters within a given spatial volume), and/or other factors. Determining that one or more clusters make up an individual contiguous object may be based on proximity of individual ones of the one or more clusters and/or other factors. For example, determining that one or more clusters make up an individual contiguous object may comprise determining, in a pairwise manner, that pairs of clusters may be within a threshold distance from one another. For example, a first set of clusters may comprise a first cluster, a second cluster, a third cluster, and/or other clusters. The first cluster may be determined to be within a threshold distance of the second cluster. The second cluster may be determined to be within a threshold distance of the third cluster. In some implementations, independent of a distance of the first cluster from the third cluster, the first set of clusters may be determined as a cluster group.

It is noted that the above description of determining cluster groups is provided for illustrative purposes only and is not to be considered limiting. For example, in some implementations, cluster groups may be determined by other techniques.

The mapping component 116 may be configured to associate, for individual cluster groups, individual clusters included in individual cluster groups with individual hand features. Individual hand features may include one or more of a wrist, a thumb, a metacarpophalangeal joint of a thumb, a palm, a finger, a metacarpophalangeal joint of a finger, a fingertip, a set of fingers, a set of metacarpophalangeal joints of a set of fingers, a set of finger tips, and/or other hand features.

In some implementations, individual clusters may be associated with individual hand features based on one or more of size of the individual clusters, shape of the individual clusters, a range of positions of surfaces in the individual clusters, known shapes and/or forms of individual hand features, known sizes of individual hand features, and/or other factors. In some implementations, association of individual clusters with individual hand features may be performed heuristically and/or based on other techniques.

In some implementations, known shapes, forms, sizes and/or other features of a human hand may comprise statistical averages for certain classes of people and/or other information. For example, average sizes, shapes, forms, and/or other features may comprise averages for one or more of human males, females, children, adults, and/or other classes of people.

In some implementations, known shapes, forms, sizes and/or other features of a human hand may be determined on a user-basis. For example, individual user's may be prompted to position their hand within a field-of-view of a distancing device so that the distancing device may sample surfaces of the individual user's own hand(s). The position information derived from sensor output measuring the individual user's own hand(s) may be used to determined one or more of an over shape, form, sizes, dimensions, and/or other features of the individual user's own hand(s). In some implementations, the user may be prompted to position their hand(s) in various orientations (e.g., palm up, palm down, palm to the side, fingers in a grip, fingers released, etc.). Dimensions may include one or more of individual lengths of individual fingers, individual lengths of individual thumbs, a width of the hand at the knuckles, a width of the hand at the palm, a surface area of the palm, and/or other dimensions. The features of the individual user's own hand(s) and/or averages (e.g., in different orientations) may be used as one or more canonical hand models from which one or more of identifications of a hand (including, for example, whether it may be a right hand or left hand), identifications of individual hand features, and/or determination of feature positions of individual hand features, may be based on.

By way of non-limiting illustration, based on a known shape and/or form of a first hand feature, and determining a shape of an individual cluster having the same or similar shape and/or form of the first hand feature, the individual cluster may be associated with the first hand feature. By way of non-limiting illustration, based on a known shape and/or form of a human thumb and determining a shape and/or form of an individual cluster that may have the same or similar shape and/or form of a human thumb, the individual cluster may be associated with a human thumb.

By way of non-limiting illustration, a first cluster group may include one or more of a first cluster, a second cluster, and/or other clusters; and a second cluster group may include one or more of a third cluster, a fourth cluster, and/or other clusters. The mapping component 116 may be configured to associate one or more of the first cluster with a first hand feature, the second cluster with a second hand feature, the third cluster with the first hand feature, the fourth cluster with a third hand feature, and/or other clusters with one or more hand features. The first cluster may be associated with the first hand feature based on the first cluster having a shape and/or form that may be the same or similar to the first hand feature. The second cluster may be associated with the second hand feature based on the second cluster having a shape and/or form that may be the same or similar to the first hand feature. The third cluster may be associated with the first hand feature based on the third cluster having a shape and/or form that may be the same or similar to the first hand feature. The fourth cluster may be associated with the third hand feature based on the fourth cluster having a shape and/or form that may be the same or similar to the third hand feature.

The confidence component 117 may be configured to determine, for individual clusters included in individual cluster groups, individual confidence levels indicating likelihood that the individual clusters represent associated individual hand features.

In some implementations, confidence levels may be represented as one or more of quantitative values, qualitative values, and/or other representations. In some implementations, a quantitative value of a confidence level may comprise a numerical value in a range of values (e.g., a confidence level scale). By way of non-limiting illustration, a range of values may comprise a value of "0" to a value of "10," and/or other values and/or ranges. A value of "0" may represent no confidence in an association of an individual cluster to an individual hand feature (e.g., that the individual cluster may not represent the associated hand feature). A value of "10" may represent a highest confidence in an association of an individual cluster to an individual hand feature. (e.g., that the individual cluster may exactly match the associated hand feature). Values between "0" and "10" may represented varying levels of confidence.

In some implementations, a quantitative value of a confidence level may comprise a percentage value. By way of non-limiting illustration, a value may comprise a percentage between "0 percent" and "100 percent," and/or other percentages. A value of "0" percent confidence may represent no confidence in an association of an individual cluster to an individual hand feature (e.g., that the individual cluster may not represent the associated hand feature). A value of "100 percent" confidence may represent highest confidence in an association of an individual cluster to an individual hand feature. (e.g., that the individual cluster may exactly match the associated hand feature). Percentages between "0" and "100" may represented varying levels of confidence.

In some implementations, a qualitative value of a confidence level may comprise a qualitative description of confidence. For example, a qualitative value of a confidence level may comprise one or more of "no confidence," "less confident," "somewhat confident," "more confident," "very confident," and/or other qualitative descriptions.

In some implementations, determining a confidence level for an individual cluster of an individual cluster group may be based on one or more of an association of the individual cluster with an individual hand feature, one or more associations of one or more other clusters in the individual cluster group with individual hand features, one or more anatomical relationships between hand features, and/or other information. Anatomical relationships may comprise one or more of a directional relationship between hand features, a distance relationship between hand features, an orientation relationship between hand features, and/or other relationships.

By way of non-limiting example, determining a confidence level for an individual cluster of an individual cluster group may be based on an association of the individual cluster with an individual hand feature, a quantity of clusters surrounding the individual cluster and/or their associations with hand features, and/or other information. By way of non-limiting illustration, a first cluster group may include two clusters; and a second cluster group may include six clusters. If both clusters in the first cluster group are associated with a palm of hand, than a confidence level that either of the clusters being a palm of a hand may be low, given that a hand does not have more than one palm. If four clusters in the second cluster group are associated with finger, one cluster associated with a thumb, and one cluster associated with a palm, individual confidence levels for individual ones of the associations of individual ones of the clusters may be high, given that a hand typically has four fingers, a thumb, and a palm.

In some implementations, determining a confidence level for an individual cluster of an individual cluster group may be based on comparison of the cluster group a canonical hand model. The comparison may include determining a fit of the cluster group with the canonical hand model. Determining a confidence level for an individual cluster of an individual cluster group may be based on the fit of the individual cluster group with the canonical hand model. By way of non-limiting illustration, a first cluster group may include a set of clusters that may be individual associated with fingers and/or other hand features. Based on comparing lengths of the individual clusters in the first cluster group with lengths of fingers and/or other features associated with the canonical hand model, confidence levels may be determined. For example, if a length of a first cluster may be determined to be three times the length (or other amount) of a second cluster, than a confidence level indicating likelihood that the first cluster represents a finger may below, given that fingers of a hand do not vary that dramatically in length.

It is noted that the above description of determining confidence levels is provided for illustrative purposes only and is not to be considered limiting. For example, in some implementations, confidence levels may be determined by other techniques.

By way of non-limiting illustration, a first cluster group may include one or more of a first cluster, a second cluster, and/or other clusters; and a second cluster group may include one or more of a third cluster, a fourth cluster, and/or other clusters. The confidence component 117 may be configured to determine one or more of a first confidence level indicating likelihood that the first cluster represents a first hand feature, a second confidence level indicating likelihood that the second cluster represents a second hand feature, a third confidence level indicating likelihood that the third cluster represents the first hand feature, a fourth confidence level indicating likelihood that the fourth cluster represents a third hand feature, and/or other confidence levels indicating likelihood that other clusters represent one or more hand features.

The confidence component 117 may be configured to determine, for individual cluster groups, individual aggregate confidence levels. The individual aggregate confidence levels may indicate likelihood that the individual cluster groups represent a hand and/or other human features. The individual aggregate confidence levels may comprise aggregates of individual confidence levels determined for individual clusters included in the individual cluster groups. In some implementations, an aggregate may be determined from an aggregate function including one or more of an average, a maximum, a median, a minimum, a mode, a sum, and/or other aggregate functions.

By way of non-limiting illustration, a first cluster group may include one or more of a first cluster, a second cluster, and/or other clusters; and a second cluster group may include one or more of a third cluster, a fourth cluster, and/or other clusters. The confidence component 117 may be configured to determine one or more of a first aggregate confidence level indicating likelihood that the first cluster group represents a human hand, a second aggregate confidence level indicating likelihood that the second cluster group represents a human hand, and/or other aggregate confidence levels for other cluster groups. The first aggregate confidence level may comprise an aggregate of one or more of a first confidence level indicating likelihood that the first cluster represents a first hand feature, a second confidence level indicating likelihood that the second cluster represents a second hand feature, and/or other confidence levels for other clusters in the first cluster group. The second aggregate confidence level may comprise an aggregate of one or more of a third confidence level indicating likelihood that the third cluster represents the first hand feature, a fourth confidence level indicating likelihood that the fourth cluster represents a third hand feature, and/or other confidence levels for other clusters in the second cluster group.

The feature component 118 may be configured to identify, based on individual aggregate confidence levels, one or more cluster groups as representing a human hand and/or other features. Based on an individual cluster group being identified as representing a human hand, the position information for the individual cluster group may be determined to be conveying positions of surfaces of a human hand. In some implementations, identifying one or more clusters as representing a hand may include identifying an orientation of the hand as represented by the one or more clusters, whether a representation is of either a right hand or a left hand, and/or other information.

In some implementations, identifying an individual cluster group as representing a hand may be based on individual comparisons of the individual aggregate confidence levels of the individual cluster groups to one or more threshold confidence levels. An individual cluster group may be identified as representing a human hand based on an individual aggregated confidence level of the identified individual cluster group being above one or more threshold confidence levels. Other individual cluster groups having individual aggregate confidence levels below one or more threshold confidence levels may be disregarded as representing the hand. In some implementations, a threshold confidence level may be one or more of 99% confidence, 95% confidence, 90% confidence, 80% confidence, and/or other values.

Figure 2:
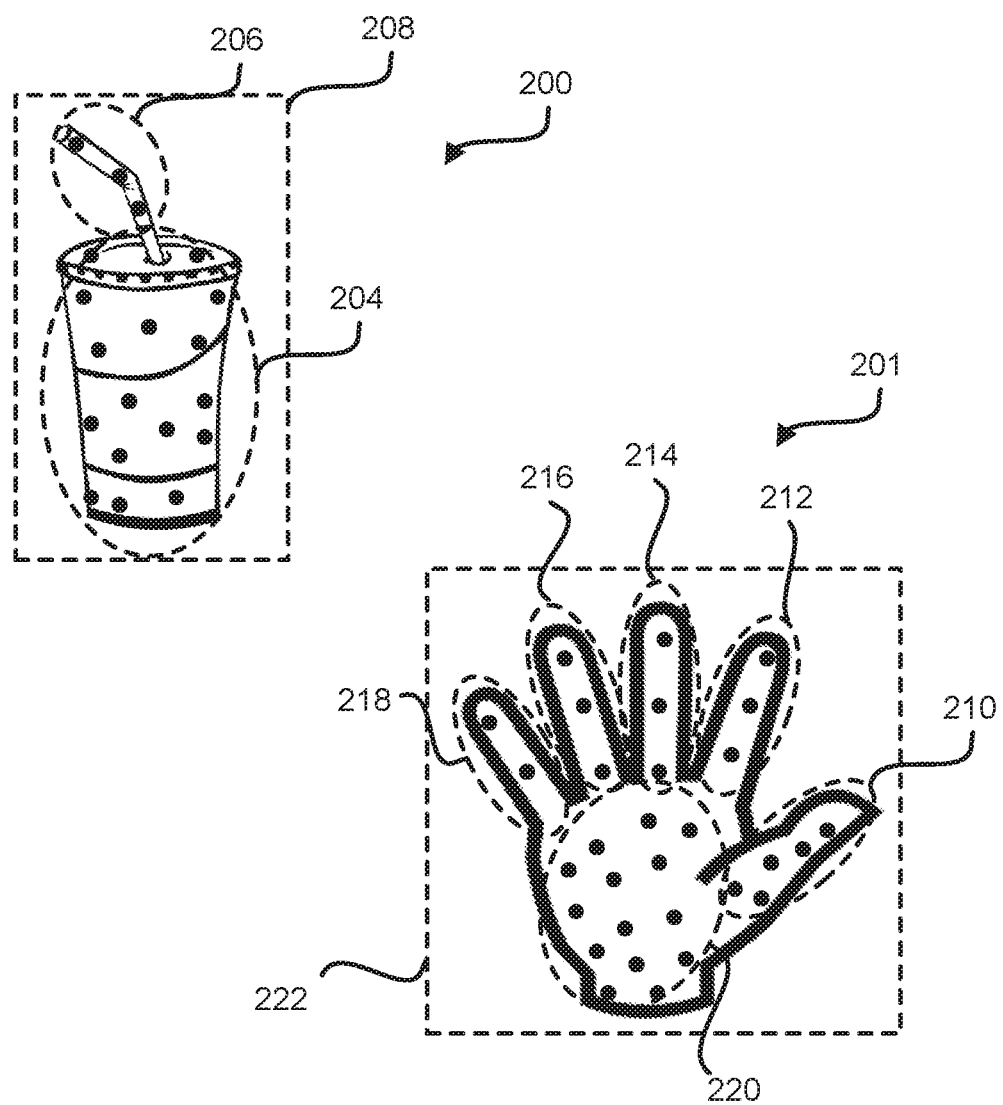
FIG. 2 is a graphic illustrating points on surfaces of real-world objects, the points representing positions of the surfaces of the real-world objects.

Referring now to FIG. 2, a graphic is shown illustrating one or more features and/or functions of one or more of input component 110, cluster component 112, group component 114, mapping component 116, confidence component 117, feature component 118, and/or other components. FIG. 2 shows generally a first real-world object 200 and a second real-world object 201 that may be with a field-of-view of a distancing device. Also shown is graphical representation of output of the distancing device in the form of black dots representing surface position measurements on first object 200 and second object 201 from which position information may be derived. It is noted however that the black dots are shown for illustrative purposes, and in a real-world implementation, may not be visible to a user. Further, it is noted that the quantity and/or arrangement of the black dots is for illustrative purposes and not intended to be limiting. For example, a distancing device may be configured to sample hundreds or thousands of surfaces in a uniform pattern and/or in other sampling patterns.

For non-limiting illustrative purposes, first object 200 may comprise a soda cup; and second object 201 may comprise a human hand. One or more computer program components may be configured to obtain position information derived from sensor output (see, e.g., input component 110). One or more computer program components may be configured to determine clusters of surfaces (see, e.g., cluster component 112). The clusters may include one or more of a first cluster 204, a second cluster 206, a third cluster 210, a fourth cluster 212, a fifth cluster 214, a sixth cluster 216, a seventh cluster 218, an eighth cluster 220, and/or other clusters.

One or more computer program components may be configured to determine cluster groups (see, e.g., group component 114). The individual cluster groups may include one or more clusters of surfaces that may make up individual contiguous objects. The cluster groups may include one or more of a first cluster group 208, a second cluster group 222, and/or other cluster groups. The first cluster group 208 may include one or more of first cluster 204, second cluster 206, and/or other clusters. The second cluster group 222 may include one or more of third cluster 210, fourth cluster 212, fifth cluster 214, sixth cluster 216, seventh cluster 218, eighth cluster 220, and/or other clusters.

One or more computer program components may be configured to associate, for the individual cluster groups, the individual clusters in the individual cluster groups with individual hand features (see, e.g., mapping component 116). By way of non-limiting illustration, first cluster 204, eighth cluster 220, and/or other clusters may be associated with a first hand feature; second cluster 206, fourth cluster 212, fifth cluster 214, sixth cluster 216, seventh cluster 218, and/or other clusters may be associated with a second hand feature; and third cluster 210 may be associated with a third hand feature. The first hand feature may include a palm of a hand; the second hand feature may include a finger of a hand; and the third hand feature may include a thumb of a hand.

One or more computer program components may be configured to determine, for the individual clusters in the individual cluster groups, individual confidence levels indicating likelihood that the individual clusters represent the associated individual hand features (see, e.g., confidence component 117). One or more computer program components may be configured to determine, for the individual cluster groups, individual aggregate confidence levels indicating likelihood that the individual cluster groups represent the hand, (see, e.g., confidence component 117). By way of non-limiting illustration, second cluster group 222 may be determined to have a higher aggregate confidence level indicating likelihood that second cluster group 222 represents a hand than an aggregate confidence level indicating likelihood that first cluster group 208 represents a hand.

One or more computer program components may be configured to identify, based on the individual aggregate confidence levels, an individual cluster group as representing the hand (see, e.g., feature component 118). For example based on the aggregate confidence level of second cluster group 222 being higher than the aggregate confidence level of first cluster group 208, second cluster group 222 may be identified as representing a hand.

Returning to FIG. 1, feature component 118 may be configured to determine individual feature positions of one or more hand features of a human hand. The individual feature positions of the individual hand features may be determined using position information of the one or more cluster groups that may be identified by feature component 118 as representing a human hand, and/or other information.

In some implementations, determining individual feature positions of individual hand features of a human hand may be based on anatomical relationships between hand features of a human hand, one or more canonical hand models, and/or other information. Anatomical relationships may comprise one or more of a directional relationship between hand features, a distance relationship between hand features, an orientation relationship between hand features, and/or other relationships. Anatomical relationships between hand features may follow one or more known conventions such that determining a feature position of one hand feature from a feature position of one or more other hand features may be possible.

By way of non-limiting illustration, given a feature position of a first hand feature of a hand, a feature position of a second hand feature of the hand may be determined based on one or more of a range of distances from the feature position of the first hand feature that may be anatomically possible to correspond to the feature position of the second hand feature, one or more directions from the feature position of the first hand feature that may be anatomically possible to point to the feature position of the second hand feature, and/or other information. By way of non-limiting illustration, given a feature position of a wrist of a hand, a feature position of a thumb of the hand may be determined based on one or more of a range of distances from the wrist position that may be anatomically possible to correspond to the feature position of the thumb, one or more directions from the feature position of the wrist that may be anatomically possible to point to the feature position of the thumb, and/or other information.

In some implementations, determining a feature position of a first hand feature may include an initial determination of an estimated feature position of the first hand feature. An estimated feature position of the first hand feature may be initially determined from position information derived from sensor output that conveys positions of surfaces of a hand. The position information conveying positions of surface of a hand may be comprise position information corresponding to one or more cluster groups identified by feature component 118 as representing the hand.

In some implementations, after an initial determination of an estimated feature position of a first hand feature, an iterative procedure may be carried out to specify feature positions of one or more hand features (e.g., to be used to track the hand and facilitate user interaction in an augmented reality environment).

In some implementations, feature component 118 may be configured to perform one or more iterations that individually include an operation of determining, based on position information and an estimated feature position of the first hand feature, an estimated feature position of a second hand feature, and/or other operations. In some implementations, determining the feature position of the second hand feature based on the feature position of the first hand feature may be based on one or more anatomical relationships between the first hand feature and second hand feature. In a first iteration of this operation, the estimated feature position of the first hand feature may include the estimated feature position that may be initially determined based on the position information conveying positions of surfaces of a hand. In subsequent iterations, the estimated feature position of the first hand feature used in this operation may include a different estimated feature position of the first hand featured determined at the end of a preceding iteration.

In some implementations, feature component 118 may be configured to perform one or more iterations that individually include an operation of determining, based on position information and an estimated feature position of the second hand feature determined in a previous operation, an estimated feature position of a third hand feature, and/or other operations. In some implementations, determining the feature position of the third hand feature based on the feature position of the second hand feature may be based on one or more anatomical relationships between the second hand feature and first hand feature.

In some implementations, feature component 118 may be configured to perform one or more iterations that individually include an operation of determining, based on position information and an estimated feature position of the third hand feature determined at a previous operation, another estimated feature position of the first hand feature, and/or other operations. In some implementations, determining the feature position of the first hand feature based on the feature position of the third hand feature may be based on one or more anatomical relationships between the first hand feature and third hand feature.

In some implementations, feature component 118 may be configured to perform one or more iterations that individually include an operation of comparing estimated feature positions of the first hand feature to determine a difference between the estimated feature positions of the first hand feature. At the first iteration, the estimated feature positions may include the initially determined feature position and the feature position determined based on the position information and the estimated feature position of the third hand feature. Based on the difference being below or equal to a threshold distance the feature component 118 may be configured to specify individual feature positions of individual ones of the first hand feature, second hand feature, third hand feature, and/or other hand features as the corresponding estimated feature positions determined in the current iteration. In some implementations, a threshold distance may be a value in a range of zero to ten millimeters, and/or other ranges and/or other values.

Based on the difference being above or equal to a threshold distance, the feature component 118 may be configured to perform one or more subsequent iterations. In the iterations following the first iteration, the estimated feature position of the first hand feature used to determine the subsequent estimated feature position of the second hand feature (e.g., the first step in the iteration) may comprise the estimated feature position of the first hand featured determined at the end of the previous iteration.

Figure 3:
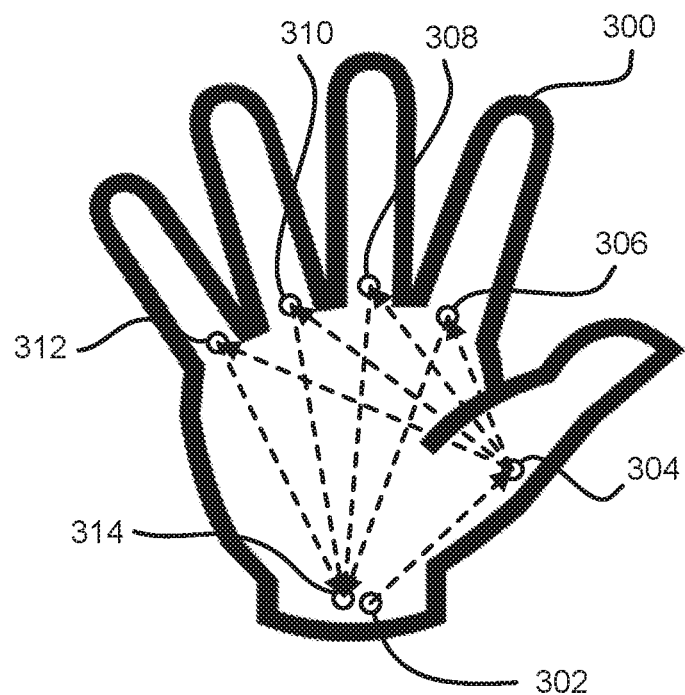
FIG. 3 is a graphic illustrating a hand and a procedure for determining one or more hand feature positions.
Figure 4:
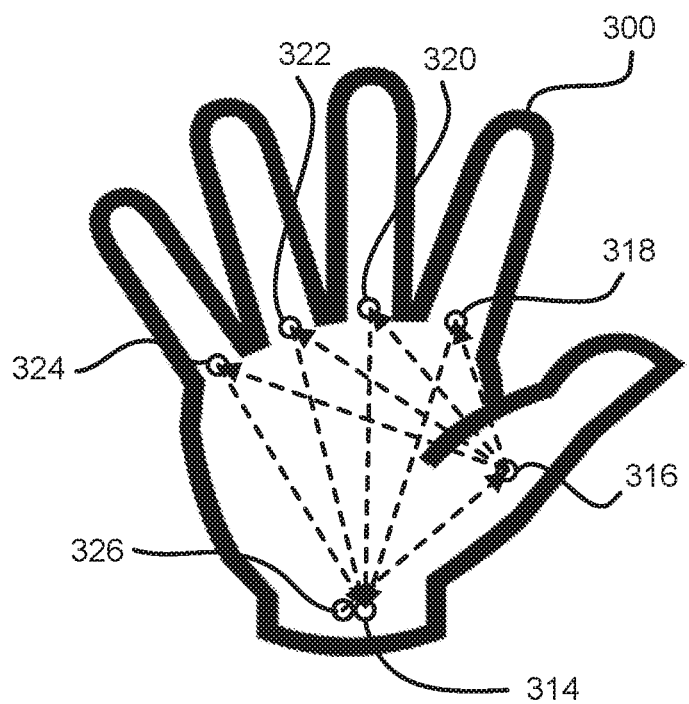
FIG. 4 is a graphic illustrating a hand and a procedure for determining one or more hand feature positions.

Referring now to FIGS. 3 and 4, a graphic is shown illustrating one or more features and/or functions of feature component 118, and/or other components. For example, FIG. 3 illustrates a first iteration performed by feature component 118; and FIG. 4 illustrates a second iteration performed by feature component 118 following the first iteration in FIG. 3. It is noted that the depictions in FIG. 3 and FIG. 4 and corresponding descriptions are provided for illustrative purposes only and are not to be considered limiting. For example, in some implementations, one or more other hand features may be used in tracking a hand. In some implementations, an order in which estimated feature positions of individual hand features may be determined may be different than that shown and described.

FIG. 3 shows a hand 300 and a graphic of an iteration comprising operations of: determining, based on position information and an initially estimated feature position 302 of a first hand feature, an estimated feature position 304 of a second hand feature; determining, based on the position information and estimated feature position 304 of the second hand feature, a set of estimated feature positions 306, 308, 310, and/or 312 of a set of hand features; determining, based on the position information and set of estimated feature positions 306, 308, 310, and/or 312 of the set of hand feature, another estimated feature position 314 of the first hand feature; comparing the estimated feature positions of the first hand feature (e.g., position 302 compared to position 314) to determine a difference between the estimated feature positions of the first hand feature; and/or other operations. In some implementations, the first hand feature may comprise a wrist and/or other hand features; the second hand feature may comprise a metacarpophalangeal joint of a thumb and/or other hand features; and the set of hand features may comprise a set of metacarpophalangeal joints of a set of fingers and/or other hand features. In some implementations, the estimated feature positions in set of estimated feature positions 306, 308, 310, and/or 312 may be determined one or more of as a set, individually in an ordered sequence, and/or determined in other ways.

In some implementations, based on the difference (e.g., between positions 314 and 302) being below a threshold distance, a feature position of the first hand feature may be specified as estimated feature position 314; a feature position of the second hand feature may be specified as estimated feature position 304; and a set of feature positions of the set of hand features may be specified as set of estimated feature positions 306, 308, 310, and/or 312, respectively. Based on the difference (between positions 308 and 302) being above the threshold distance, one or more further iterations may be performed until such a difference may be below the threshold distance (see, e.g., FIG. 4).

FIG. 4 shows a graphic illustration of a subsequent iteration performed after the iteration illustrated in FIG. 3 in the event that the difference (between positions 314 and 302) was above a threshold distance. The iteration may comprise operations of: determining, based on position information and estimated feature position 314 of the first hand feature, an estimated feature position 315 of the second hand feature; determining, based on the position information and estimated feature position 316 of the second hand feature, a set of estimated feature positions 318, 320, 322, and/or 324 of the set of hand features; determining, based on the position information and set of estimated feature positions 318, 320, 322, and/or 324 of the set of hand features, another estimated feature position 326 of the first hand feature; comparing the estimated feature positions of the first hand feature (e.g., position 326 compared to position 314) to determine a difference between the estimated feature positions of the first hand feature; and/or other operations.

In some implementations, based on the difference (between positions 326 and 314) being below a threshold distance, a feature position of the first hand feature may be specified as estimated feature position 326; a feature position of the second hand feature may be specified as estimated feature position 316; and the set of feature positions of the set of hand features may be specified as set of estimated feature positions 318, 320, 322, and/or 324, respectively. Based on the difference (between positions 326 and 314) being above the threshold distance, one or more further iterations may be performed until such a difference may be below the threshold distance.

Returning to FIG. 1, processor(s) 104, one or more distancing device 120, one or more light sources 122, one or more optical elements 124, external resources 126, and/or other components of system 100 may be operatively linked via one or more electronic communication links. For example, such electronic communication links may be established, at least in part, via network(s) 121. Network(s) 121 may comprise one or both of wired and/or wireless communications. It will be appreciated that this is not intended to be limiting and that the scope of this disclosure includes implementations in which processor(s) 104, one or more distancing device 120, one or more light sources 122, one or more optical elements 124, external resources 126, and/or other components of system 100 may be operatively linked via some other communication media.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 119, and/or other components. The processor(s) 104 may include communication lines or ports to enable the exchange of information with a network, electronic storage 119, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 119 may comprise electronic storage media that electronically stores information. The electronic storage media of electronic storage 119 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. The electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). The electronic storage 119 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, 114, 116, 117, and/or 118. Processor(s) 104 may be configured to execute components 108, 110, 112, 114, 116, 117, and/or 118 by software; hardware; firmware; some combination of software, hardware, and/or firmware; and/or other mechanisms for configuring processing capabilities on processor(s) 104.

It should be appreciated that although components 108, 110, 112, 114, 116, 117, and/or 118 are illustrated in FIG. 1 as being co-located within a single processing unit, in implementations in which processor(s) 104 includes multiple processing units, one or more of components 108, 110, 112, 114, 116, 117, and/or 118 may be located remotely from the other components. The description of the functionality provided by the different components 108, 110, 112, 114, 116, 117, and/or 118 described above is for illustrative purposes and is not intended to be limiting, as any of components 108, 110, 112, 114, 116, 117, and/or 118 may provide more or less functionality than is described. For example, one or more of components 108, 110, 112, 114, 116, 117, and/or 118 may be eliminated, and some or all of its functionality may be provided by other ones of components 108, 110, 112, 114, 116, 117, 118, and/or other components. As another example, processor(s) 104 may be configured to execute one or more additional components that may perform some or all of the functionality attributed to one of components 108, 110, 112, 114, 116, 117, and/or 118.

Figure 5:
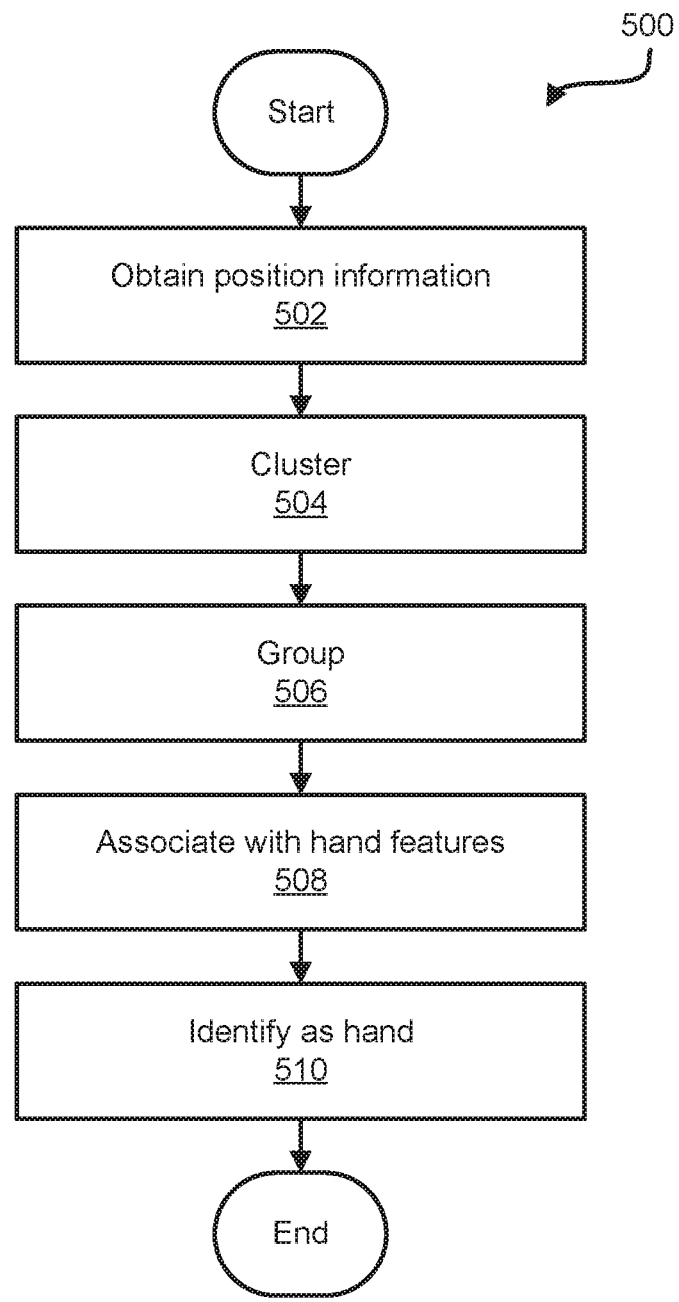
FIG. 5 illustrates a method of identifying a human hand from position information.

FIG. 5 illustrates a method 500 of identifying a human hand from position information, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more distancing devices, one or more optical elements, and/or other components. The one or more processing devices may include one or more devices executing some or all of the operations of method 500 in response to instructions stored electronically on electronic storage media. The one or more processing devices may include one or more devices configured through hardware, firmware, and/or software to be specifically designed for execution of one or more of the operations of method 500.

At an operation 502, position information may be obtained. The position information may be derived from output signals of one or more distancing devices. The position information may include positions of surfaces of real-world objects. In some implementations, operation 502 may be performed by one or more physical processors executing an input component the same as or similar to input component 110 (shown in FIG. 1 and described herein).

At an operation 504, clusters of surfaces may be determined from the position information. In some implementations, operation 504 may be performed by one or more physical processors executing a cluster component the same as or similar to cluster component 112 (shown in FIG. 1 and described herein).

At an operation 506, cluster groups may be determined. The individual cluster groups may include one or more clusters of surfaces that may make up individual contiguous objects. In some implementations, operation 506 may be performed by one or more physical processors executing a group component the same as or similar to group component 114 (shown in FIG. 1 and described herein).

At an operation 508, for the individual cluster groups, the individual clusters in the individual cluster groups may be associated with individual hand features. In some implementations, operation 508 may be performed by one or more physical processors executing a mapping component the same as or similar to mapping component 116 (shown in FIG. 1 and described herein).

At an operation 510, an individual cluster group may be identified as representing a human hand. In some implementations, an individual cluster group may be identified based on one or more of individual confidence levels indicating likelihood that the individual clusters represent associated individual hand features, individual aggregate confidence levels indicating likelihood that the individual cluster groups represent a hand, and/or other information. In some implementations, operation 510 may be performed by one or more physical processors executing one or both of a confidence component and/or a feature component the same as or similar to confidence component 117 and feature component 118 (shown in FIG. 1 and described herein).

Figure 6:
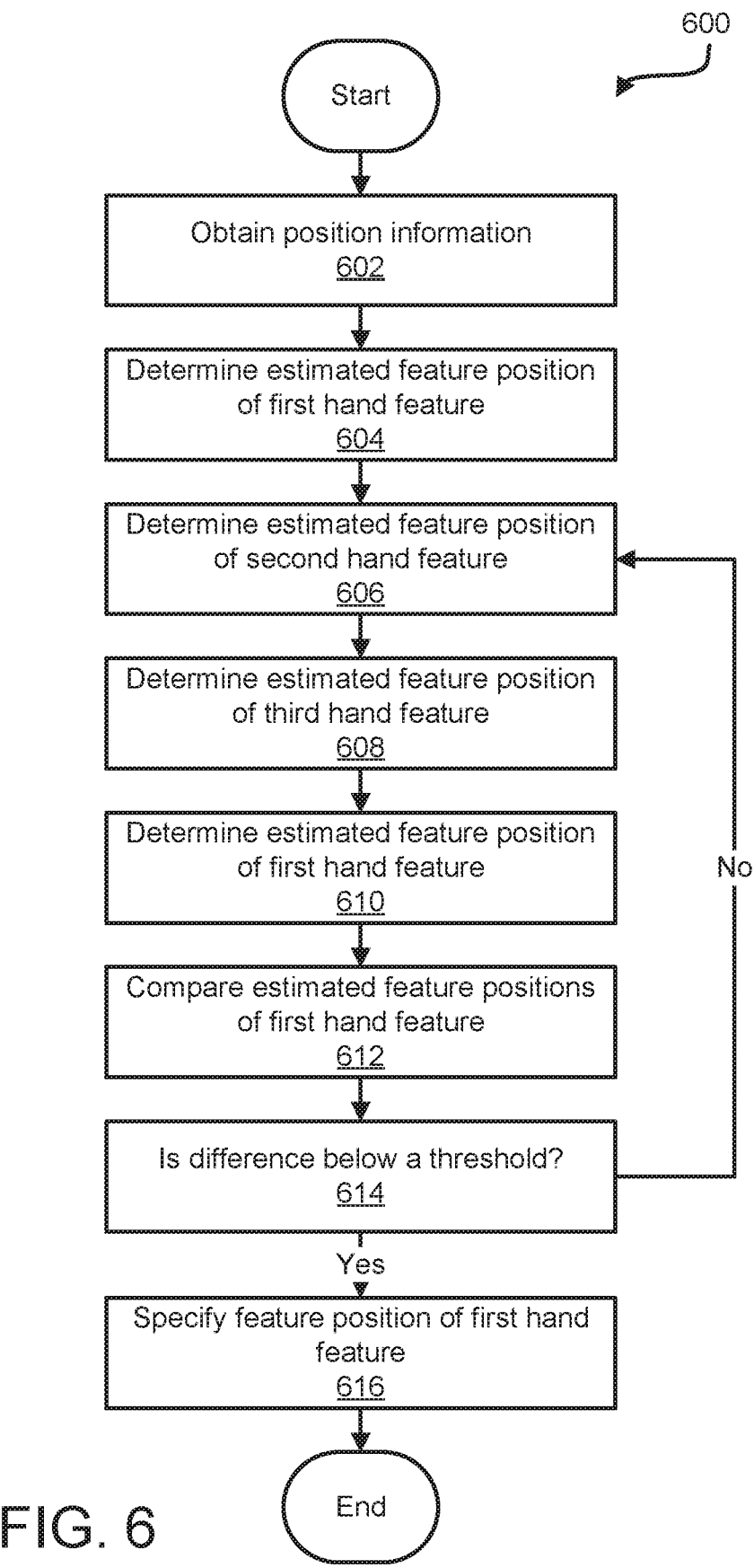
FIG. 6 illustrates a method of tracking a human hand in an augmented reality environment.

FIG. 6 illustrates a method 600 of tracking a human hand in an augmented reality environment, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more distancing devices, one or more optical elements, and/or other components. The one or more processing devices may include one or more devices executing some or all of the operations of method 600 in response to instructions stored electronically on electronic storage medium. The one or more processing devices may include one or more devices configured through hardware, firmware, and/or software to be specifically designed for execution of one or more of the operations of method 600.

At an operation 602, position information may be obtained. The position information may include positions of surfaces of a human hand. A hand may have one or more of a first hand feature, a second hand feature, a third hand feature, and/or other hand features. In some implementations, operation 602 may be performed by one or more physical processors executing an input component the same as or similar to input component 110 (shown in FIG. 1 and described herein).

At an operation 604 an estimated feature position of the first hand feature may be determined from the position information. In some implementations, operation 604 may be performed by one or more physical processors executing a feature component the same as or similar to feature component 118 (shown in FIG. 1 and described herein).

At an operation 606, based on the position information and the estimated feature position of the first hand feature, an estimated feature position of the second hand feature may be determined. In some implementations, operation 606 may be performed by one or more physical processors executing a feature component the same as or similar to feature component 118 (shown in FIG. 1 and described herein).

At an operation 608, based on the position information and the estimated feature position of the second hand feature, an estimated feature position of the third hand feature may be determined. In some implementations, operation 608 may be performed by one or more physical processors executing a feature component the same as or similar to feature component 118 (shown in FIG. 1 and described herein).

At an operation 610, based on the position information and the estimated feature position of the third hand feature, another estimated feature position of the first hand feature. In some implementations, operation 610 may be performed by one or more physical processors executing a feature component the same as or similar to feature component 118 (shown in FIG. 1 and described herein).

At an operation 612, the estimated feature positions of the first hand feature may be compared to determine a difference between the estimated feature positions of the first hand feature. In some implementations, operation 612 may be performed by one or more physical processors executing a feature component the same as or similar to feature component 118 (shown in FIG. 1 and described herein).

At an operation 614, a determination may be made of whether the difference is below a threshold distance. In some implementations, operation 614 may be performed by one or more physical processors executing a feature component the same as or similar to feature component 118 (shown in FIG. 1 and described herein).

At an operation 616, based on the difference being below the threshold distance, one or more feature positions may be specified for one or more hand features. By way of non-limiting illustration, a first feature position of the first hand feature may be specified as the estimated feature position of the first hand feature determined based on the estimated feature position of the third hand feature, a second feature position of the second hand feature may be specified as the estimated feature position of the second hand feature, a third feature position of the third hand feature may be specified as the estimated feature position of the third hand feature, and/or other feature positions of other hand features may be specified as their estimated feature positions. In some implementations, operation 616 may be performed by one or more physical processors executing a feature component the same as or similar to feature component 118 (shown in FIG. 1 and described herein).

In some implementations, based on the difference being above the threshold distance, another iteration of operations 606-614 may be perform using the estimated feature position of the first hand feature determined at the end of a previous iteration.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to track a human hand in an interactive environment, the system comprising:
one or more physical processors configured by machine-readable instructions to:
obtain position information conveying positions of surfaces of a human hand, the hand having a first hand feature and other hand features;
determine, based on the position information, an estimated feature position of the first hand feature; and
perform an iteration of:
determining estimated feature positions of the other hand features based on the estimated feature position of the first hand feature;
determining an other estimated feature position of the first hand feature based on the estimated feature positions of the other hand features; and
determining a difference between the estimated feature position of the first hand feature and the other estimated feature position of the first hand feature; and
wherein:
based on the difference being below a threshold distance, specify:
a first feature position of the first hand feature as the other estimated feature position of the first hand feature;
feature positions of the other hand feature as the estimated feature positions of the other hand features; and.
based on the difference being above the threshold distance, perform another iteration using the other estimated feature position of the first hand feature as the estimated feature position of the first hand feature.

2. The system of claim 1, wherein:
the first hand feature comprises a wrist; and
the other hand features include a metacarpophalangeal joint of a thumb and a set of metacarpophalangeal joints of a set of fingers.

3. The system of claim 1, wherein the one or more physical processors are further configured by machine-readable instructions to:
determine, from the position information, clusters of surfaces;
determine cluster groups, the individual cluster groups including one or more clusters of surfaces that make up individual contiguous objects;
associate the individual clusters in the individual cluster groups with individual hand features;
determine, for the individual clusters in the individual cluster groups, individual confidence levels indicating likelihood that the individual clusters represent the associated individual hand features;
determine, for the individual cluster groups, individual aggregate confidence levels indicating likelihood that the individual cluster groups represent the hand, the individual aggregate confidence levels being an aggregate of the individual confidence levels of the individual clusters in the individual cluster groups; and
identify, based on the individual aggregate confidence levels, an individual cluster group as representing the hand.

4. The system of claim 3, wherein identifying, based on the individual aggregate confidence levels, the individual cluster group as representing the hand comprises:
comparing the individual aggregate confidence levels to a threshold confidence level; and
identifying the individual cluster group as representing the hand based on the individual aggregated confidence level of the individual cluster group being above the threshold confidence level.

5. The system of claim 3, wherein an individual hand feature includes one or more of a wrist, a thumb, a metacarpophalangeal joint of a thumb, a palm, a finger, a metacarpophalangeal joint of a finger, a fingertip, a set of fingers, a set of metacarpophalangeal joints of a set of fingers, or a set of fingertips.

6. The system of claim i, wherein the position information comprises point cloud information, the point cloud information including positions of points that lie on the surfaces of the real-world objects, such that the positions of the points are the positions of the surfaces.

7. The system of claim 1, further comprising:
a light source configured to emit light; and
an optical element, the optical element being configured to provide the light emitted from the light source to an eye of the user.

8. The system of claim 7, wherein the one or more physical processors are further configured by machine-readable instructions to:
generate views of virtual content to be perceived within the field-of-view of the user; and
facilitate user interaction with the virtual content based on the first feature position of the first hand feature and the feature positions of the other hand features.

9. The system of claim 8, wherein the virtual content includes one or more virtual objects.

10. The system of claim 1, wherein position information is obtained based on a sampling rate of a distancing device.

11. A method to track a human hand in an interactive environment, the method being implemented in a computer system comprising one or more physical processors and non-transitory storage media storing machine-readable instructions, the method comprising:
obtaining position information conveying positions of surfaces of a human hand, the hand having a first hand feature and other hand features;
determining, based on the position information, an estimated feature position of the first hand feature; and
performing an iteration of:
determining estimated feature positions of the other hand features based on the estimated feature position of the first hand feature;
determining an other estimated feature position of the first hand feature based on the estimated feature positions of the other hand features; and
determining a difference between the estimated feature position of the first hand feature and the other estimated feature position of the first hand feature; and wherein:
based on the difference being below a threshold distance, specify:
a first feature position of the first hand feature as the other estimated feature position of the first hand feature;
feature positions of the other hand feature as the estimated feature positions of the other hand features; and
based on the difference being above the threshold distance, perform another iteration using the other estimated feature position of the first hand feature as the estimated feature position of the first hand feature.

12. The method of claim 11, wherein:
the first hand feature comprises a wrist; and
the other hand features include a metacarpophalangeal joint of a thumb and a set of metacarpophalangeal joints of a set of fingers.

13. The method of claim 11, further comprising:
determining, from the position information, clusters of surfaces;
determining cluster groups, the individual cluster groups including one or more clusters of surfaces that make up individual contiguous objects;
associating the individual clusters in the individual cluster groups with individual hand features;
determining, for the individual clusters in the individual cluster groups, individual confidence levels indicating likelihood that the individual clusters represent the associated individual hand features;
determining, for the individual cluster groups, individual aggregate confidence levels indicating likelihood that the individual cluster groups represent the hand, the individual aggregate confidence levels being an aggregate of the individual confidence levels of the individual clusters in the individual. cluster groups; and
identifying, based on the individual aggregate confidence levels, an individual cluster group as representing the hand.

14. The method of claim 13, wherein identifying, based on the individual aggregate confidence levels, the individual cluster group as representing the hand comprises:
comparing the individual aggregate confidence levels to a threshold confidence level; and
identifying the individual cluster group as representing the hand based on the individual aggregated confidence level of the individual cluster group being above the threshold confidence level.

15. The method of claim 13, wherein an individual hand feature includes one or more of a wrist, a thumb, a metacarpophalangeal joint of a thumb, a palm, a finger, a metacarpophalangeal joint of a finger, a fingertip, a set of fingers, a set of metacarpophalangeal joints of a set of fingers, or a set of fingertips.

16. The method of claim 11, wherein the position information comprises point cloud information, the point cloud information including positions of points that lie on the surfaces of the real-world objects, such that the positions of the points are the positions of the surfaces.

17. The method of claim 11, further being implemented using a light source configured to emit light, and an optical element, the optical element being configured to provide light emitted from the light source to an eye of the user.

18. The method of claim 17, further comprising:
generating views of virtual content to be perceived within the field-of-view of the user; and
facilitating user interaction with the virtual content based on the first feature position of the first hand feature and the feature positions of the other hand features.

19. The method of claim 18, Wherein the virtual. content includes one or more virtual objects.

20. The method of claim 11, wherein the position information is obtained based on a sampling rate of a distancing device.

* * * * *